United States Patent
Villette et al.

(10) Patent No.: US 11,402,051 B2
(45) Date of Patent: Aug. 2, 2022

(54) SYSTEM FOR INSTALLING INSULATION SLEEVES ON PIPELINES

(71) Applicant: Saudi Arabian Oil Company, Dhahran (SA)

(72) Inventors: Thibault Tarik Villette, Al-Khobar (SA); Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/103,685

(22) Filed: Nov. 24, 2020

(65) Prior Publication Data

US 2022/0065384 A1 Mar. 3, 2022

Related U.S. Application Data

(63) Continuation-in-part of application No. 17/009,573, filed on Sep. 1, 2020, and a continuation-in-part of application No. 17/009,579, filed on Sep. 1, 2020.

(51) Int. Cl.
*F16L 59/02* (2006.01)
*F16L 55/11* (2006.01)
(Continued)

(52) U.S. Cl.
CPC .......... *F16L 59/028* (2013.01); *B23K 37/02* (2013.01); *F16L 55/1116* (2013.01);
(Continued)

(58) Field of Classification Search
CPC .......... F16L 59/021–024; F16L 59/028; F16L 55/1116; B23K 37/02; B29C 63/06
(Continued)

(56) References Cited

U.S. PATENT DOCUMENTS 2,941,570 A * 6/1960 Plym ...................... B29C 53/60
156/203
3,162,895 A * 12/1964 Pusch ................... F16L 59/022
425/445
(Continued)

FOREIGN PATENT DOCUMENTS

AU    2016214075    2/2020
CN    205534838     8/2016
(Continued)

OTHER PUBLICATIONS

PCT International Search Report and Written Opinion in International Appln. No. PCT/US2021/048647, dated Dec. 22, 2021, 13 pages.
(Continued)

*Primary Examiner* — Patrick F Brinson
(74) *Attorney, Agent, or Firm* — Fish & Richardson P.C.

(57) ABSTRACT

Systems and methods include a system for installing insulation sleeves on pipelines. A portable welding robot is configured to weld a plug base longitudinally along a top edge of a pipeline. The plug base supports plugs configured to engage with holes in both overlapping sides of an insulation sleeve configured to insulate the pipeline. A portable pipeline insulation installation fixture is configured to lift the insulation sleeve and install the insulation sleeve around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline.

20 Claims, 11 Drawing Sheets

(51) Int. Cl.
*B23K 37/02* (2006.01)
*B32B 1/08* (2006.01)
*B23K 9/025* (2006.01)
*B29C 63/06* (2006.01)

(52) U.S. Cl.
CPC ........... *F16L 59/021* (2013.01); *F16L 59/029* (2013.01); *B23K 9/025* (2013.01); *B29C 63/06* (2013.01); *B32B 1/08* (2013.01); *B32B 2264/108* (2013.01); *B32B 2307/304* (2013.01); *B32B 2367/00* (2013.01); *B32B 2375/00* (2013.01)

(58) Field of Classification Search
USPC .... 138/149, 99, 177, 156, 170, 171; 29/431, 29/890.14; 156/215
See application file for complete search history.

(56) References Cited

U.S. PATENT DOCUMENTS

| | | | |
|---|---|---|---|
| 3,899,913 A * | 8/1975 | Schlosser | B29C 63/06 72/401 |
| 3,982,564 A | 9/1976 | Clabbum et al. | |
| 3,984,906 A * | 10/1976 | Schlosser | B29C 63/06 156/392 |
| 4,084,306 A | 4/1978 | Barker | |
| 5,934,337 A * | 8/1999 | Fiala | F16L 59/023 138/158 |
| 7,036,531 B2 | 5/2006 | Manini et al. | |
| 7,393,427 B2 * | 7/2008 | Bright | B29C 63/06 156/215 |
| 8,397,765 B2 | 3/2013 | Jackson et al. | |
| 9,435,571 B2 | 9/2016 | Ghoshal et al. | |
| 9,863,571 B2 | 1/2018 | Critsinelis et al. | |
| 2006/0231193 A1* | 10/2006 | Bright | F16L 58/1054 156/217 |
| 2010/0260551 A1 | 10/2010 | Jespersen et al. | |
| 2011/0073206 A1 | 3/2011 | Na | |
| 2016/0018049 A1 | 1/2016 | Yodogawa et al. | |
| 2019/0027615 A1 | 1/2019 | Zheng et al. | |

FOREIGN PATENT DOCUMENTS

| | | |
|---|---|---|
| CN | 109882683 | 6/2019 |
| CN | 110280941 | 9/2019 |
| CN | 110711995 | 1/2020 |
| CN | 111365568 | 7/2020 |
| EP | 3254010 | 12/2017 |
| KR | 20110134562 | 12/2011 |
| WO | WO 2009111008 | 9/2009 |
| WO | WO 2017008748 | 1/2017 |
| WO | WO 2018097718 | 5/2018 |
| WO | WO 2021113 572 | 6/2021 |

OTHER PUBLICATIONS

PCT International Search Report and Written Opinion in International Appln. No. PCT/US2021/048378, dated Jan. 5, 2022, 14 pages.
PCT International Search Report and Written Opinion in International Appln. No. PCT/US2021/048646, dated Jan. 5, 2022, 14 pages.
U.S. Appl. No. 16/704,973, Villete et al., filed Dec. 15, 2019.
U.S. Appl. No. 17/009,573, Villete et al., filed Sep. 1, 2020.
U.S. Appl. No. 17/009,579, Villete et al., filed Sep. 1, 2020.
masterbond.com [online], "Epoxies with Low Coefficient of Thermal Expansion," available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.

* cited by examiner

SYSTEM FOR INSTALLING INSULATION SLEEVES ON PIPELINES

CROSS-REFERENCE TO RELATED APPLICATIONS

This application is a continuation-in-part of and claims the benefit of priority to U.S. patent application Ser. No. 17/009,573, filed on Sep. 1, 2020, and U.S. patent application Ser. No. 17/009,579, filed on Sep. 1, 2020, the contents of which are hereby incorporated by reference.

BACKGROUND

The present disclosure applies to techniques for installing installation sleeves on pipelines, including sleeves that improve the flow in pipelines.

Once extracted from a well, wet crude oil is transported to be processed in Gas and Oil Separation Plants (GOSPs). Subsequently, the export crude oil is sent to refineries for processing, or to tank farm terminals (TFTs) for storing or shipping, through pipelines system using electromechanical pumps. The flow of these fluids, wet crude oil, and export crude oil, is facilitated by a decrease of viscosity. As viscosity decreases, the temperature of the fluid increases. Thus, keeping the fluids warm is beneficial in order to assure the flow of these fluids. Greater temperatures decrease the energy consumption of the pump (by decreasing the pumping load). This increases the longevity and durability of the rotating equipment (by decreasing potential damage, damage propagation, fatigue, and creep).

SUMMARY

The present disclosure describes techniques that can be used for installing installation sleeves on pipelines, including sleeves that improve the flow in pipelines. For example, the installation techniques can be used to install Shape Memory Polymer Based Passive Thermal Diode (SMP-PTD) and describes a Polymer Thermal Expansion Based Passive Thermal Diode (PTE-PTD) apparatus.

In some implementations, a system is used for installing insulation sleeves on pipelines. A portable welding robot is configured to weld a plug base longitudinally along a top edge of a pipeline. The plug base supports plugs configured to engage with holes in both overlapping sides of an insulation sleeve configured to insulate the pipeline. A portable pipeline insulation installation fixture is configured to lift the insulation sleeve and install the insulation sleeve around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. The installation techniques can facilitate precision positioning of a technical sleeve system around a pipeline. The sleeve position is important, for example, to allow the graphene mesh to optimally capture sun light (external face at the top). Moreover, systems based on Phase Change Material Based Passive Thermal Diode (PCM)-PTD and SMP-PTD sleeves use gravity as partial force for the cyclic return to an open diode position. The installation techniques can facilitate the easy removal, maintenance, commissioning, and upgrade (for example, providing plug-and-play abilities) compared to typical insulation systems in which removing the insulation sleeve requires destruction (for example, cutting) of the insulation sleeve. The installation techniques can provide movability/portability. This is because the whole installation system can be taken apart and used in the field as well as in a remote place. The installation techniques are ergonomic, as the system does not require workers to carry any load. The installation techniques provide automation and repeatability. For example, the adjustment of the technical sleeve is done through commanding electric hoists. The history of adjustment can be recorded (for example, using a computer) in order for the installation process to be replicated for other pipeline sections. The sleeves that are installed and be used to passively control viscosity in crude transportation systems, including passive increasing fluid temperature. The techniques combine the advantages of using insulation to wrap the pipeline to avoid thermal leaks at low temperatures and the absence of insulation at higher temperatures to retain the fluid's viscosity. For example, this combines the advantages of an insulator (to avoid thermal outflow at low external temperatures such as during the night) and the absence of an insulator (to benefit from thermal inflow at higher external temperatures). SMP-PTD techniques can also be applied to above ground steel pipelines while controlling low temperatures impacting fluid's viscosity that may impact the load of pump stations. Techniques maximize the thermal inflow over a daily temperature cycle. Various configurations can be used to find a practical way for elaborating the passive thermal diode for pipelines using contact switch based on shape memory polymer. The techniques can consider the synergistic effects of thermal expansion of a standard polymer with a shape memory polymer. The techniques can provide highly-maximized daily thermal inflow, reduce the need for an active heat exchanger, eliminate the need for a power supply (and the hazard of a nearby power source), provide easy assembly, and increase the impact of pump durability.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for installing insulation wraps on pipelines. For example, the installation techniques can be used for a Shape Memory Polymer Based Passive Thermal Diode (SMP-PTD) apparatus. For example, the SMP-PTD can serve as a multi-layer sleeve that is wrapped around a pipeline and pinned along the top of the pipeline to complete installation. The installation techniques can also be used for a Polymer Thermal Expansion Based Passive Thermal Diode (PTE-PTD).

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The insulation wraps that are installed using techniques described in the present disclosure can be used to passively maximize the thermal flow going into the pipeline. This can lead to increasing or maintaining the temperature of a fluid being transported in the pipeline, while minimizing the thermal flow leaving the pipeline. The techniques can be used, for example, in pipeline providing oil and gas transportation.

Numerical analysis can show that the arrangement of the selected materials of the insulation wraps described with reference to designs of the present disclosure can accommodate external changes in temperature in an efficient way. This includes generating a displacement greater than the 5 millimeter (mm) air gap located at the bottom of a system.

The solution described here combines the advantages of an insulator (for example, to avoid thermal outflow at low external temperatures such as during the night) and the absence of an insulator (for example, to benefit from thermal inflow at higher external temperatures). As a result, the techniques can maximize the thermal inflow over a diurnal temperature cycle.

Figure 1A:
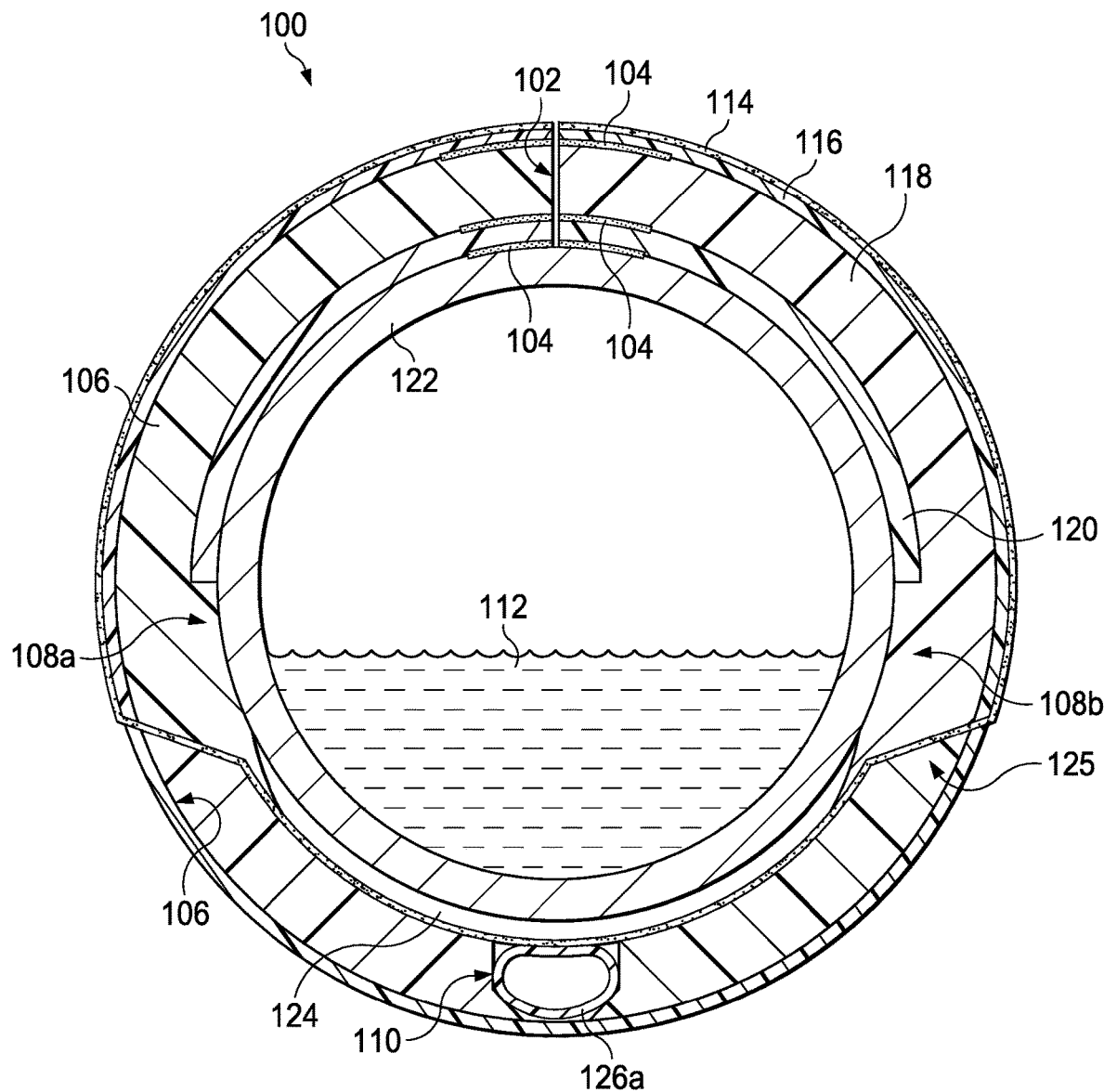
FIG. 1A is a cross sectional view of an example of a section of the Shape Memory Polymer Based Passive Thermal Diode (SMP-PTD), according to some implementations of the present disclosure.

FIG. 1A is a cross sectional view of an example of a section of an SMP-PTD 100, according to some implementations of the present disclosure. Components of the SMP-PTD 100 include an assembly system 102, bonding 104, low friction contacts 106, left and right polyethylene terephthalate (PET) blocks 108a and 108b, and a sliding contact 110. The SMP-PTD 100 transports transported fluid 112 (for example, oil). Layers of the SMP-PTD 100 include a graphene layer (for example, 4 mm thick), a PET layer 114 (for example, 20 mm thick), a polyurethane (PU) layer 116 (for example, 10 mm thick), a PET layer 118 (for example, 20 mm thick), a PU layer 120 (for example, 10 mm thick), a steel pipe 122 (for example, 12.5 mm thick), an air gap 124, and an SMP ring 126a. The SMP ring 126a has an aspect ratio that will change as a function of the lateral pressure, itself due to the expansion of the PET layer 118. The graphene layer 114 follows a small path 125 through the layers of the SMP-PTD 100 to establish contact with the pipe.

The SMP-PTD 100 is designed to simultaneously: 1) increase the temperature of the transported fluid when the temperature of the surrounding environment is greater than a fixed temperature of deformation of the material (called hereafter $T_t$—this temperature is close to the desired temperature of the fluid; and 2) cut the heat transfer between the fluid and the environment when outside temperature falls below $T_t$.

The SMP-PTD 100 does not need a power supply to be activated. For this reason, the SMP-PTD 100 can be described as a passive thermal diode. This provides a way to maximize thermal flow going from outside to inside the pipeline and minimizes thermal flow from inside to outside the pipeline.

The PU layer can provide insulation to the pipeline to avoid thermal leaks through the PET blocks (FIG. 1A). The bottom of the SMP-PTD does not require a PU layer as the insulation is provided through an air gap. The "assembly system" at the top of the SMP-PTD allows the system to be mounted onto the pipeline and to provide an anchor point to the moving parts of the SMP-PTD. Small cavities are designed on each side of the SMP-PTD in order for the graphene web to access the air gap located between the pipeline and bottom components. Cavities are small enough not to compromise structural integrity of the system. The graphene web can be folded in order to fit through the cavities.

Figure 1B:
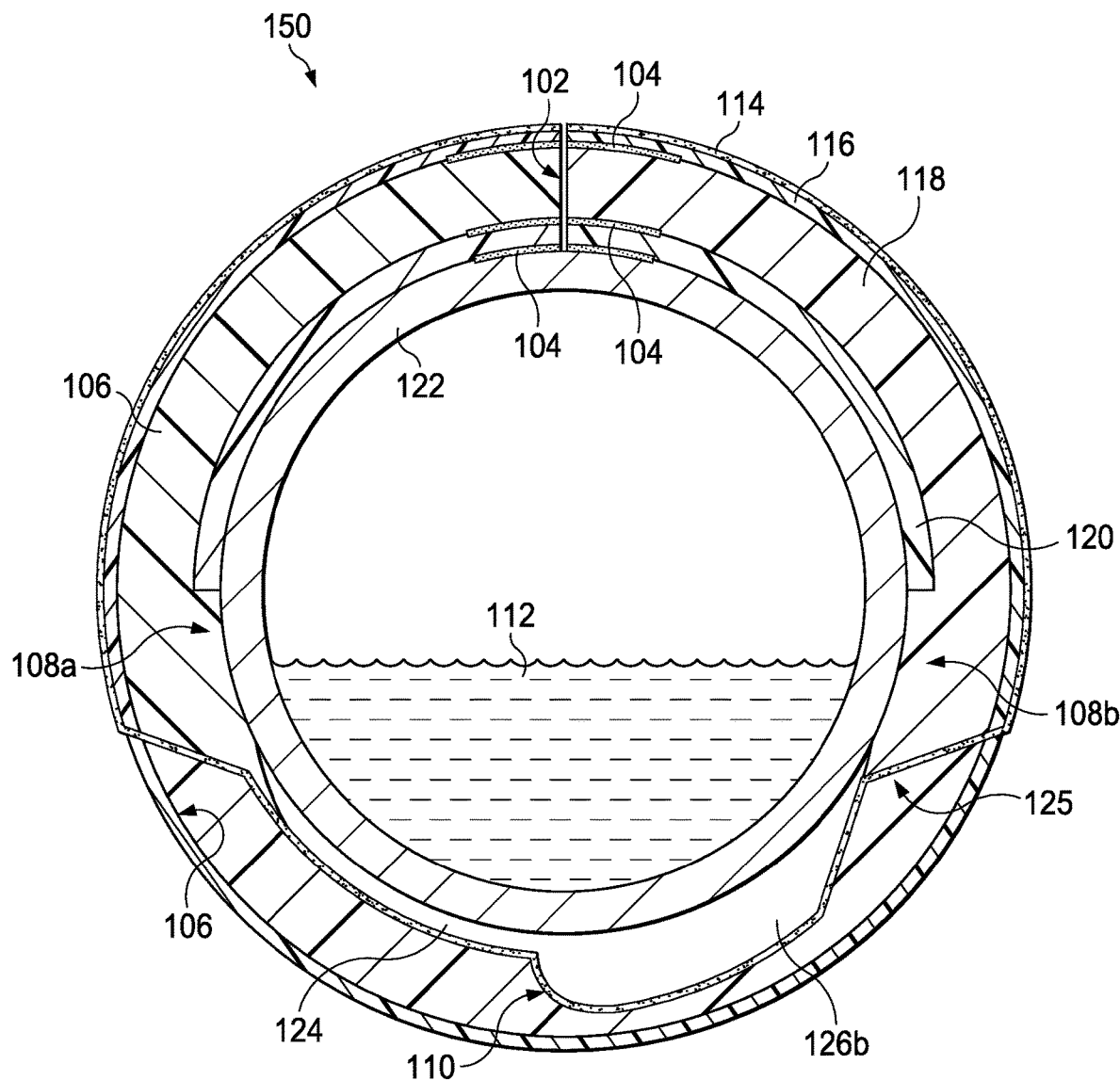
FIG. 1B is a cross sectional view of an example of a section of the Polymer Thermal Expansion Based Passive Thermal Diode (PTE-PTD), according to some implementations of the present disclosure.

FIG. 1B is a cross sectional view of an example of a section of a PTE-PTD 150, according to some implementations of the present disclosure. Components of the PTE-PTD 150 include the assembly system 102, the bonding 104, the low friction contacts 106, the left and right PET blocks 108a and 108b, and the sliding contact 110. The PTE-PTD 150 transports the transported fluid 112 (for example, oil). Layers of the PTE-PTD 150 include a graphene layer (for example, 4 mm thick), the PET layer 114 (for example, 20 mm thick), the PU layer 116 (for example, 10 mm thick), the PET layer 118 (for example 20 mm thick), the PU layer 120 (for example 10, mm thick), and the steel pipe 122 (for example, 12.5 mm thick). The assembly system 102 further includes the small air gap 124 (for example, 5 mm), a large air gap 126b (for example, 20 mm), and the small path 125 through the PET blocks. The large air gap 126b can result from a thinner wall of the right PET block 108b. The assembly system 102 can be manufactured with the large air block 126b on either the right side (as shown in FIG. 1B) or the left side.

The temperature of the transported fluid increases when the temperature of the surrounding environment is greater than a fixed temperature of deformation of the material (called hereafter $T_t$). This temperature is close to the desired temperature of the fluid. The heat transfer between the fluid and the environment is cut when the outside temperature falls below $T_t$. As a result, the viscosity of the fluid drops when outside temperature is higher than $T_t$. Also, the low viscosity is maintained, or increases very slightly, when the environment is colder than $T_t$ (for example, during the night).

The PTE-PTD 150 does not need a power supply to be activated. For this reason, the PTE-PTD 150 can be described as a passive thermal diode. This can provide a way to maximize thermal flow going from outside to inside the pipeline, and can minimize thermal flow leaving the pipeline.

The PU layer can provide insulation to the pipeline to avoid thermal leaks through the PET blocks (FIG. 1B). The bottom of the PTE-PTD does not require a PU layer as the insulation is provided through an air gap. The "assembly system" at the top of the PTE-PTD allows the system to be mounted onto the pipeline and to give an anchor point to the moving parts of the PTE-PTD. Small cavities are designed on each side of the PTE-PTD in order for the graphene web to access the air gap located between the pipeline and bottom components. Cavities are small enough not to compromise structural integrity of the system. The graphene web can be folded in order to fit through the cavities.

Figure 2:
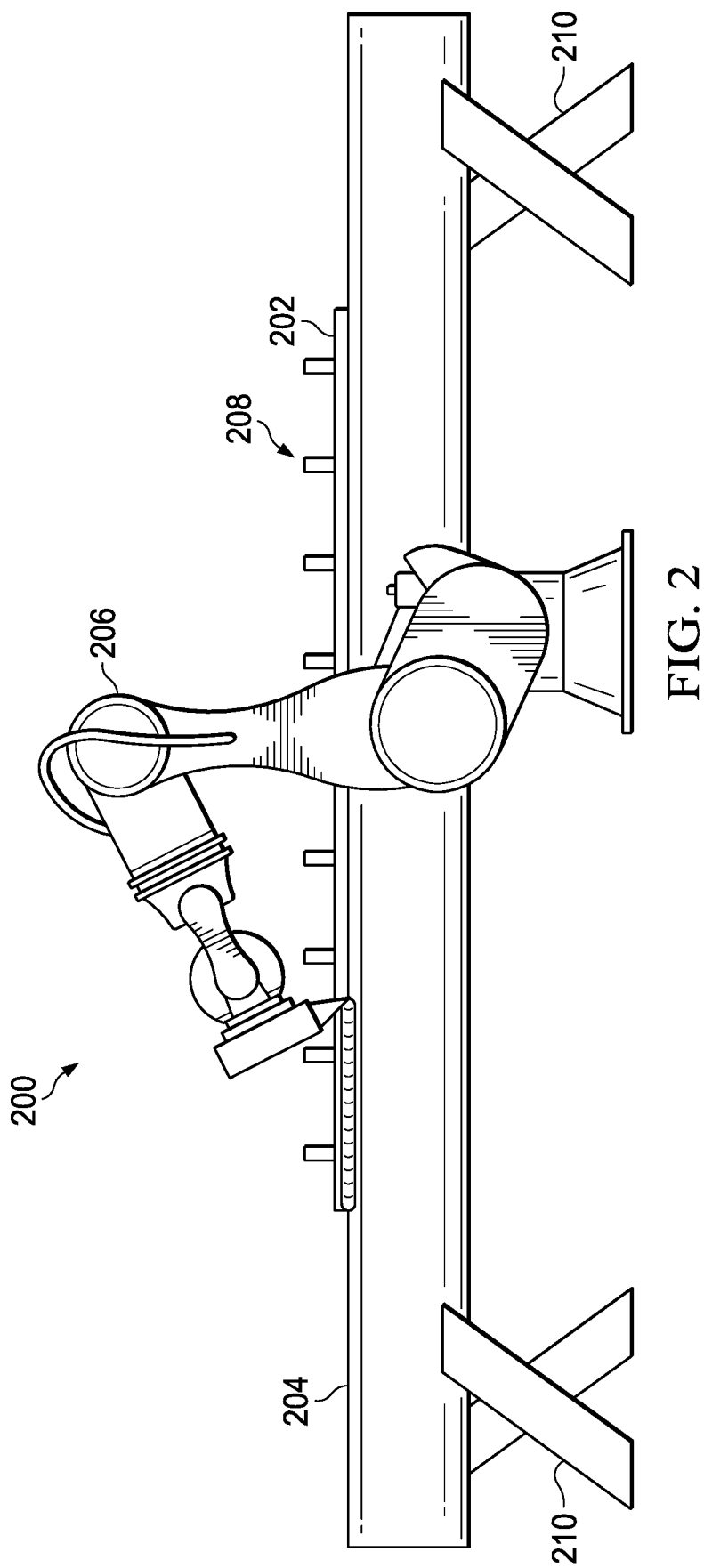
FIG. 2 is a diagram of an example of a system for performing an automated welding of a plug base to a pipeline, according to some implementations of the present disclosure.

FIG. 2 is a diagram of an example of a system 200 for performing an automated welding of a plug base 202 to a pipeline 204, according to some implementations of the present disclosure. The plug base 202 can be, for example, a linear steel bar that is welded or glued to the pipeline 204. As an example, the pipeline 204 can be made of carbon steel, with a diameter between 6 and 56 inches, for example. The plug base 202 can be welded to the pipeline 204 using, for example, a 5-axis welding robot 206. Several fixation plugs 208 can be welded or screwed to the plug base 202. The plugs 208 can be hollow metallic cylinders that are fixed to the plug base 202 by welding (for example, by the robot 206) or by screwing (for example, into an internally threaded plug base 202). Pipeline carriers 210 can serve as stands to support and maintain the pipeline 204 at a high and stable position during system installation. The pipeline carriers 210 can provide some space between the ground and the pipeline 204, allowing space to engage a sleeve system to be positioned underneath a pipe section of the pipeline 204. The sleeve can be the SMP-PTD 100 or the PTE-PTD 150, for example.

Figure 3A:
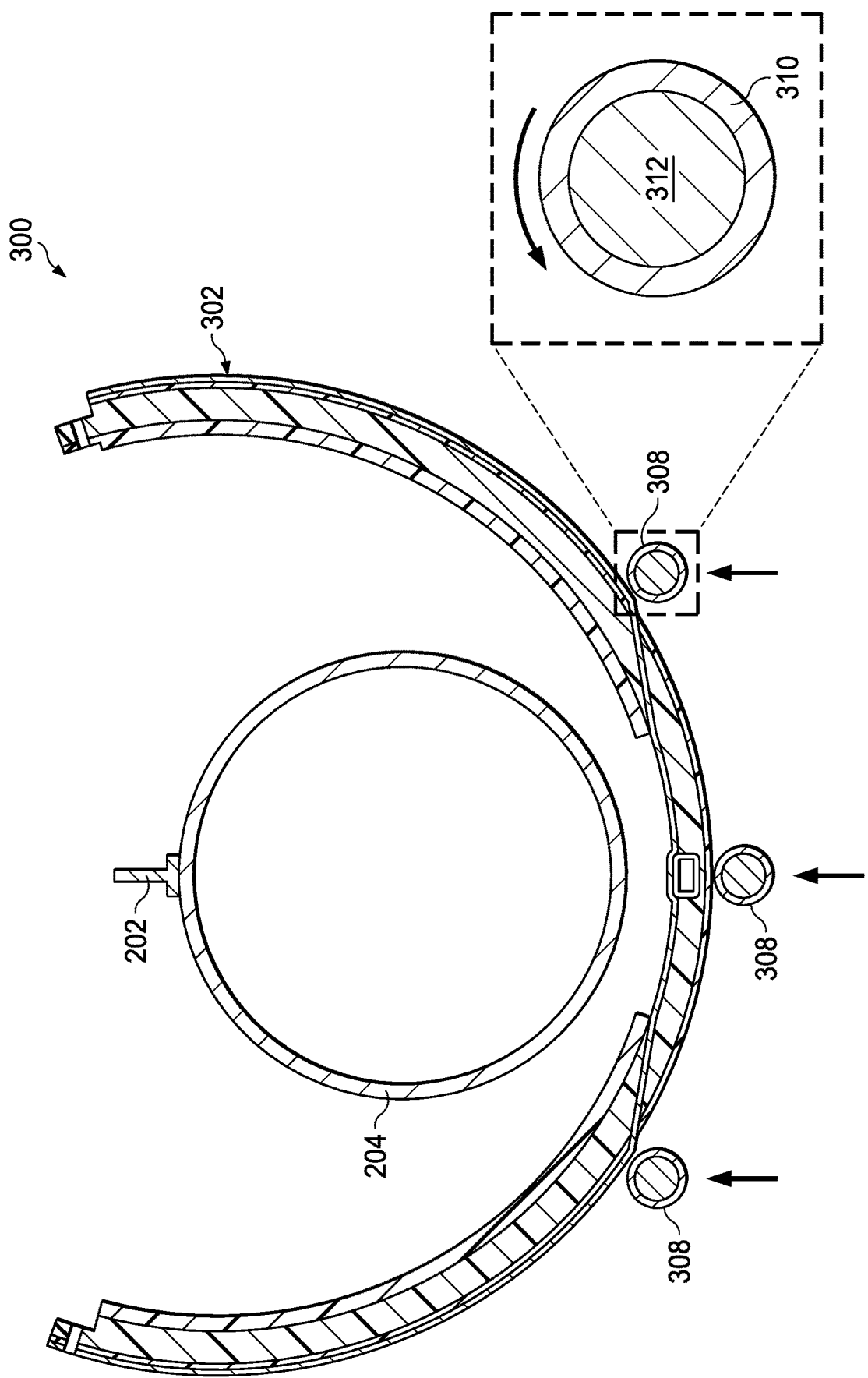
FIG. 3A is a diagram of an example of system for installing an SMP-PTD, according to some implementations of the present disclosure.

FIG. 3A is a diagram of an example of system 300 for installing an SMP-PTD 302, according to some implementations of the present disclosure. For example, the system 300 includes the SMP-PTD 302, a technical sleeve that is to be wrapped around the pipeline 204.

Vertically moving strands 308 can serve as positioning strands (for example, 1 inch in diameter). The length of the strands 308 is larger than the length of the system (or a section of pipe insulation) to be installed. When the positioning 308 strands move up, they squeeze the sleeve system against the pipeline 204. An external polymer tubular layer 310 can be a hollow polymer cylinder made of low-friction polymer, for example, Polytetrafluoroethylene (PTFE) or PP. The connection between a steel strand (for example, the pipeline 204) and a polymer tube is a sliding-rotating connection. The diameter polymer tubular layer 310 can be 1 inch, with a thickness is ¼ inch. The low-friction property can minimize friction with a sleeve system to avoid risk of damaging the sleeve system. A steel strand 312 (for example, ½ inch in diameter) is fitted inside the external polymer tubular layer 310 and is longer than the sleeve system to be installed.

Figure 3B:
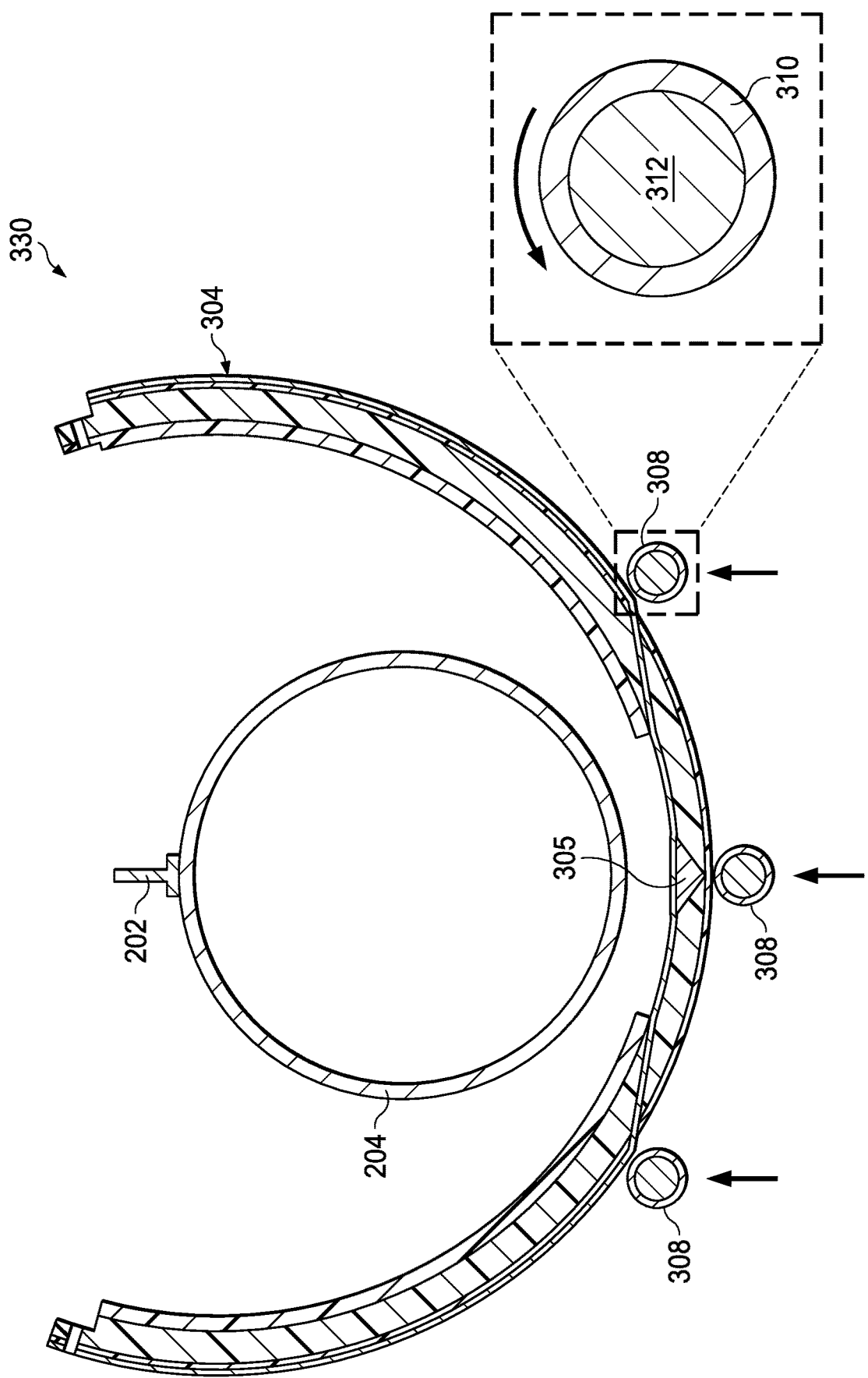
FIG. 3B is a diagram of an example of system for installing a Phase Change Material (PCM)-PTD, according to some implementations of the present disclosure.

FIG. 3B is a diagram of an example of system 330 for installing a Phase Change Material (PCM)-PTD 304, according to some implementations of the present disclosure. For example, the system 300 includes the PCM-PTD 304, a technical sleeve that is to be wrapped around the pipeline 204.

The pipeline 204 (or length of the pipeline 204) that receives the PCM-PTD 304 is generally above-ground (not a buried pipeline). The pipeline 204 is exposed to the sun. Transported fluid 112 is depicted in the pipeline 204. In this example, the pipeline 204 is steel pipe and has a wall thickness of about 12.5 millimeters (mm). The PCM-PTD 304 is applicable for pipelines of various diameters and wall thicknesses.

The PCM-PTD 304 employs a principle of a mechanical switch (or a contact switch) having two positions decided by external temperature. In certain embodiments, one position (no-contact position or insulation position) of the switch corresponds with an internal graphene sheet (a thermal conductor) of the PCM-PTD 304 not in contact with the pipeline 204. The other position (contact position or no-insulation position) of the mechanical switch places the internal graphene sheet into contact with the pipeline 204.

The mechanical switch may be in the contact position (no-insulation position) in response to the external temperature being greater than that of the PCM. With the switch in the contact position, heat transfer occurs from the environment through the internal graphene sheet to the pipeline 204. The mechanical switch may be in the no-contact position (insulation position) in response to the external temperature being less than that of the PCM. With the switch in the no-contact position, no heat transfer occurs through the internal graphene sheet between the environment and the pipeline 204.

The functioning of the mechanical switch may be driven by a combination of (1) thermal expansion of a control material (for example, PCM) in the PCM-PTD 304 and (2) two polymer layers of the PCM-PTD 304 having dissimilar thermal expansion coefficients.

The PCM-PTD 304 has heat-transfer material layers which may be flexible (not rigid). An external heat transfer layer (or external graphene sheet) and an internal heat transfer layer (or internal graphene sheet). While the discussion herein may focus on the heat transfer layers as graphene, other materials (for example, carbon nanotubes) are applicable for the heat transfer layers.

In operation, movement of the internal graphene sheet may affect heat transfer between the pipeline 204 and the environment. For instance, with the internal graphene sheet not in contact with the pipeline 204, the internal graphene sheet does not act a thermal conduit for heat transfer between the environment and the pipeline 204. Such positioning (no contact with the pipeline 204) of the internal graphene sheet may be beneficial when the external temperature is low (for example, at night). Heat is not loss from the pipeline 204 through the internal graphene sheet to the environment. Thus, the temperature of the transported fluid 112 may be generally maintained (not decrease or not decrease significantly) to avoid viscosity increase. The insulation material layer and the air gap may thermally insulate the pipeline 204.

When the internal graphene sheet moves into contact with the pipeline 204, heat transfer occurs through the internal graphene sheet from the environment and the pipeline 204. Such may be advantageous when the external temperature is high (for example, during the day). Heat transfer occurs from the environment to the pipeline 204 to beneficially increase temperature of the transported fluid 112 to decrease viscosity of the transported fluid 112. Graphene material has a relatively high thermal conductivity. The heat transfer through the internal graphene sheet bypasses the insulation material layer and the air gap.

The external graphene sheet resides on the exterior of the PCM-PTD 304 around the circumference of the PCM-PTD 304. The external graphene sheet may have a coupling arrangement (for example, including eyelets or grommets) to affix the two ends of the external graphene sheet to each other. The internal graphene sheet is disposed (resides) under (adjacent) a length of the external graphene sheet and also extends into the interior of the lower portion of the PCM-PTD 304. During assembly, a portion of the internal graphene sheet may be inserted into the PCM-PTD 304.

While the graphene sheet is an internal graphene sheet, a portion of the internal graphene sheet is on the exterior of the polymer shell underneath and in contact with the external graphene sheet. This portion (outside portion) of the internal graphene sheet being in contact with the external graphene sheet may provide for thermal coupling of the internal graphene sheet.

The PCM-PTD 304 has a polymer shell (an outer polymer layer) and an inner polymer layer that have dissimilar thermal expansion coefficients. The inner polymer layer will generally have a greater thermal expansion coefficient than the polymer shell so that more expansion occurs to the inside of the polymer shell. The polymer shell and the inner polymer layer may be bonded (via bond) to each other at an upper portion of the PCM-PTD 304. In operation of the PCM-PTD 304, there may be movement of the inner polymer layer with respect to the polymer shell, such as at the middle or lower portions of the PCM-PTD 304. The contact between the polymer shell and the inner polymer layer may be low-friction contact. For example, the inner polymer layer may be coated with a relatively thin layer of polytetrafluoroethylene (PTFE).

The polymer shell may be, for example, an epoxy. The epoxy may be a cured (crosslinked) epoxy resin having epoxide groups. The epoxy may be a thermoset polyepoxide polymer. The polymer shell may have a thickness, for example, in a range of 2 mm to 6 mm, or at least 4 mm.

The inner polymer layer may be, for example, polyethylene terephthalate (PET). The inner polymer layer may have a thickness, for example, in a range of 10 mm to 30 mm (or 15 mm to 25 mm), or at least 20 mm.

The inner polymer layer may be two sections or blocks that mate or interface at the assembly system (an assembly arrangement) at a top portion of the PCM-PTD 304. The assembly system facilitates mounting of the PCM-PTD 304 onto the pipeline 204 and may give an anchor point (or anchor length or anchor region) for moving parts of the PCM-PTD 304.

The inner polymer-layer blocks that interface at the assembly system may be a left section and right section, respectively, of the inner polymer layer. A cavity 305 between the blocks at a bottom portion of the PCM-PTD 304 may be a cavity for a control material to reside. The control material may be a material having a thermal expansion coefficient greater than 2.0e-4 K-1. The control material may be a PCM or PCM bag.

The PCM-PTD 304 has an insulation material layer (hereinafter insulation layer) in an upper portion of the PCM-PTD 304 and an air gap as an insulation layer in a bottom portion of the PCM-PTD 304. The insulation layer is bonded (via the bond) to an upper portion of the outer surface of the pipeline 204. The insulation layer may be optionally additionally bonded (via optional bond) to the inner polymer layer at an upper portion of the PCM-PTD 304. In embodiments, the bond is not implemented do to facilitate subsequent maintenance of the PCM-PTD 304. The bonds may be, for example, an epoxy glue that withstands the mechanical and temperature performance. For the PCM-PTD 304 working at greater temperatures, may be, for example, a silicone-based glue or a sodium silicate glue.

In operation of the PCM-PTD 304, there may be movement of the inner polymer layer with respect to the insulation layer, such as at the middle or lower portions of the PCM-PTD 304. The contact between the insulation layer and the inner polymer layer may be relatively low-friction contact. As mentioned, the inner polymer layer may be coated, for example, with PTFE.

The insulation layer may have a thermal conductivity coefficient, for example, in a range of 0.01-0.05 watts per meter-kelvin (W/(m·K). The insulation layer may be, for instance, polyurethane (PU) (for example, polyurethane foam) or a phenolic material (for example, phenolic foam). The thickness of the insulation layer may be, for example, in the range of 5 mm to 25 mm, or at least 10 mm. In operation, the insulation layer may prevent or reduce thermal leaks from the pipeline 204 through the polymer blocks. The bottom portion of the PCM-PTD 304 may not employ an insulation layer material because insulation is provided via the air gap.

In the illustrated embodiment, the PCM-PTD 304 includes a PCM bag, which is PCM inside a bag. The bag may be a flexible container, pouch, containment bag, barrier bag, etc. The bag can be, for example, an elastomer material. Employment of the PCM as housed in a bag may be for convenience (ease-of-installation) and containment of the PCM. In some implementations without a bag, the PCM might adsorb onto the internal graphene layer, or infiltrate between the inner polymer layer and the internal graphene layer or polymer shell. The bag contains the PCM in solid and liquid forms. Without the bag, the PCM in liquid form might not remain in place in the cavity in which the PCM bag resides.

In operation, the PCM bag (including the PCM and the bag) expands and contracts. The greatest rates of expansion and contraction of the PCM bag may be during phase transition of the PCM in the bag. The rate of expansion may be greatest when the PCM in the bag is changing from solid to liquid. The rate of expansion may continue to be relatively high with the PCM as a liquid and as the temperature further increases above the phase transition temperatures. The rate of contraction may be greatest when the PCM in the bag is changing from liquid to solid. The contact between the PCM bag and the inner polymer-layer blocks may be characterized as a sliding contact.

Cavities (paths, holes, cylindrical holes, etc.) on each side of the PCM-PTD 304 receive the internal graphene sheet (for example, a graphene web). Thus, the internal graphene sheet reaches (accesses or interfaces) the PCM bag and air gap so that the internal graphene sheet may be placed into engagement (contact) with the bottom portion of the pipeline 204. The cavities may be sized relatively small so not to decrease structural integrity of the PCM-PTD 304. For installation of the internal graphene sheet, a leading portion of the internal graphene sheet (for example, graphene web) may be folded in order to be inserted (or fit) with and through the cavities.

Figure 3C:
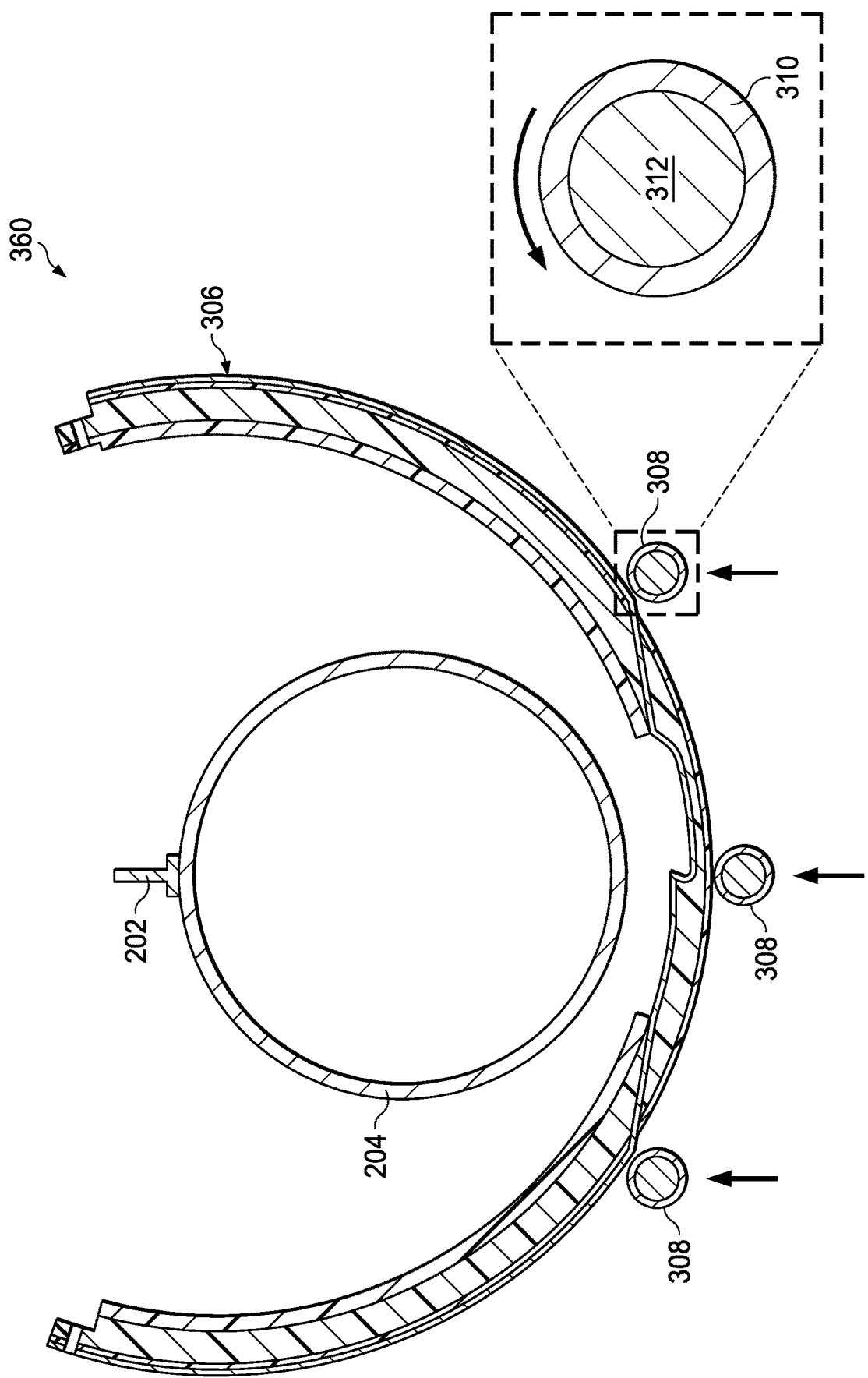
FIG. 3C is a diagram of an example of system for installing a PTE-PTD, according to some implementations of the present disclosure.

FIG. 3C is a diagram of an example of system 360 for installing a PTE-PTD 306, according to some implementations of the present disclosure. For example, the system 300 includes a PTE-PTD technical sleeve 306 that is to be wrapped around the pipeline 204.

Figure 4:
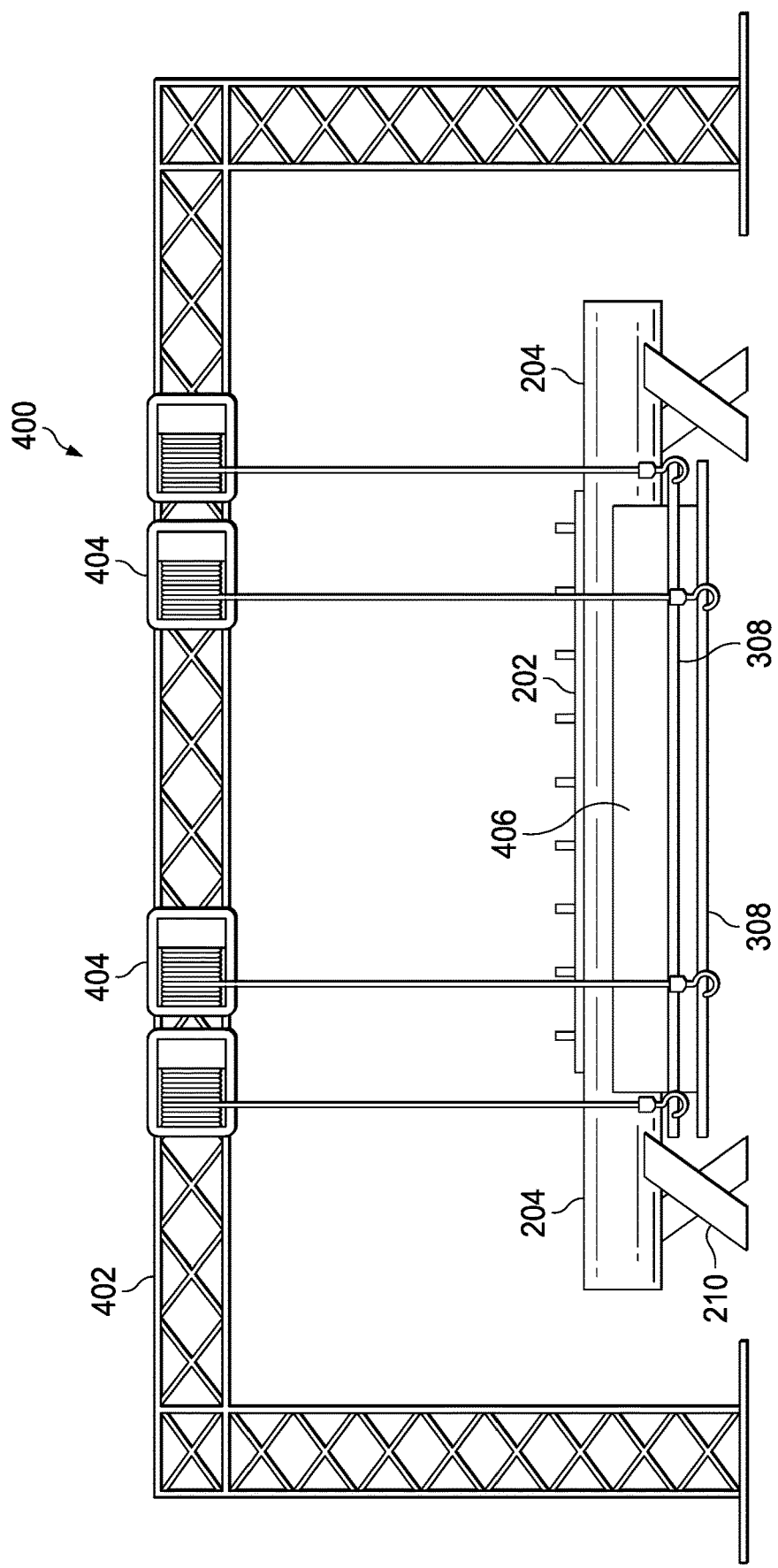
FIG. 4 is a diagram of an example of a pipeline insulation installation system, according to some implementations of the present disclosure.

FIG. 4 is a diagram of an example of a pipeline insulation installation system 400, according to some implementations of the present disclosure. The pipeline insulation installation system 400 can be used to install the SMP-PTD 302, the PCM-PTD 304, or the PTE-PTD 306, for example.

A rigid metallic frame 402 supports the load from electric hoists 404, moving strands 308 and a technical sleeve 406 (for example, the PTE-PTD 306). Electric hoists 404 are fixed to a frame of the pipeline insulation installation system 400 and can move horizontally to adapt to different sleeve sizes. The electric hoists 404 can be synchronized to keep moving and maintaining the strand 308 horizontal during an upward motion.

Figure 5A:
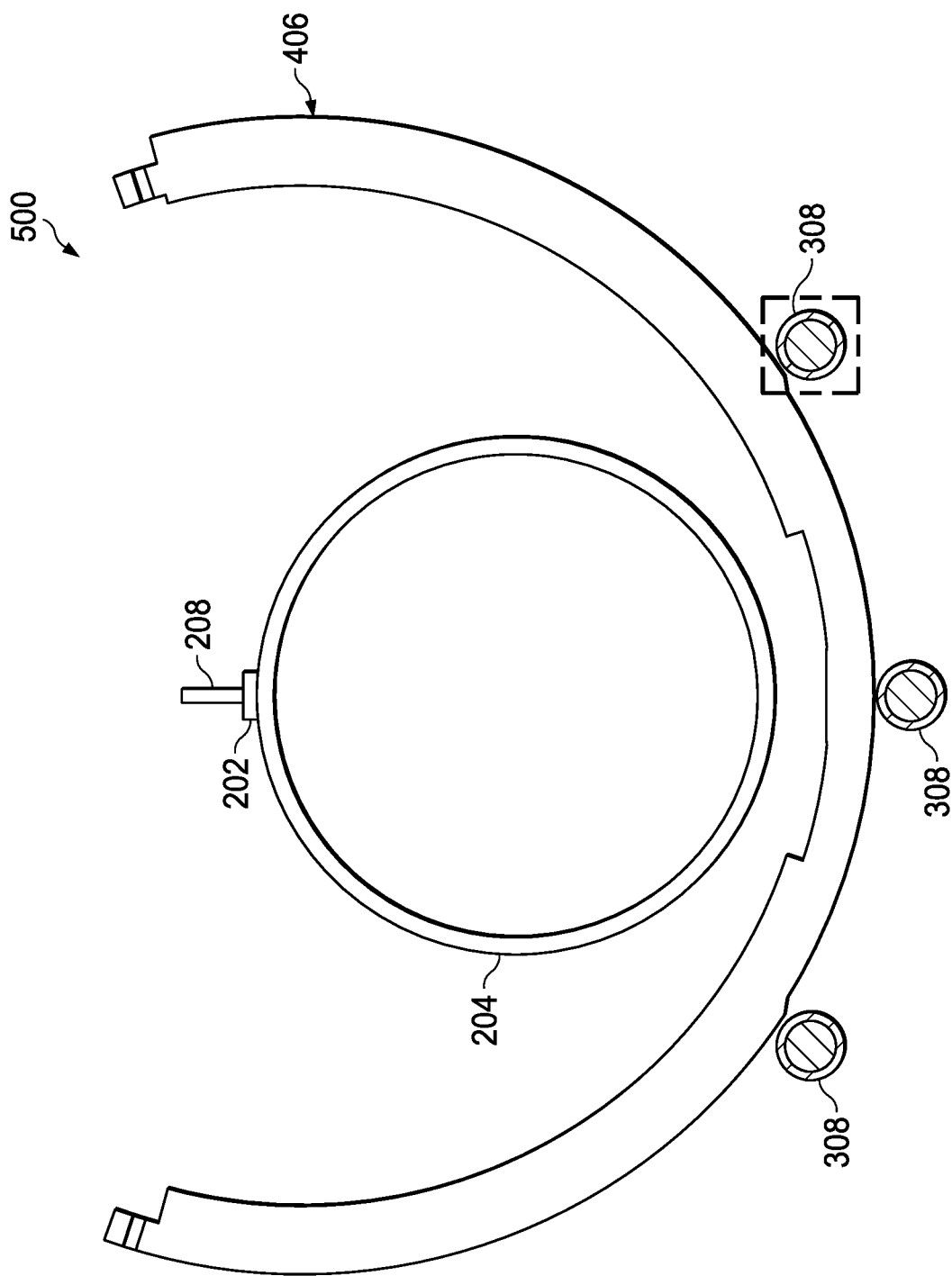
FIG. 5A is a diagram of a starting position of the technical sleeve and the strands relative to the pipeline during installation, according to some implementations of the present disclosure.

FIG. 5A is a diagram of a starting position 500 of the technical sleeve 406 and the strands 308 relative to the pipeline 204 during installation, according to some implementations of the present disclosure. The starting position 500 can serve as Step 1 of an installation process of the technical sleeve 406, for example, before ends of the technical sleeve 406 are engaged with the plugs 208 on the plug base 202.

Figure 5B:
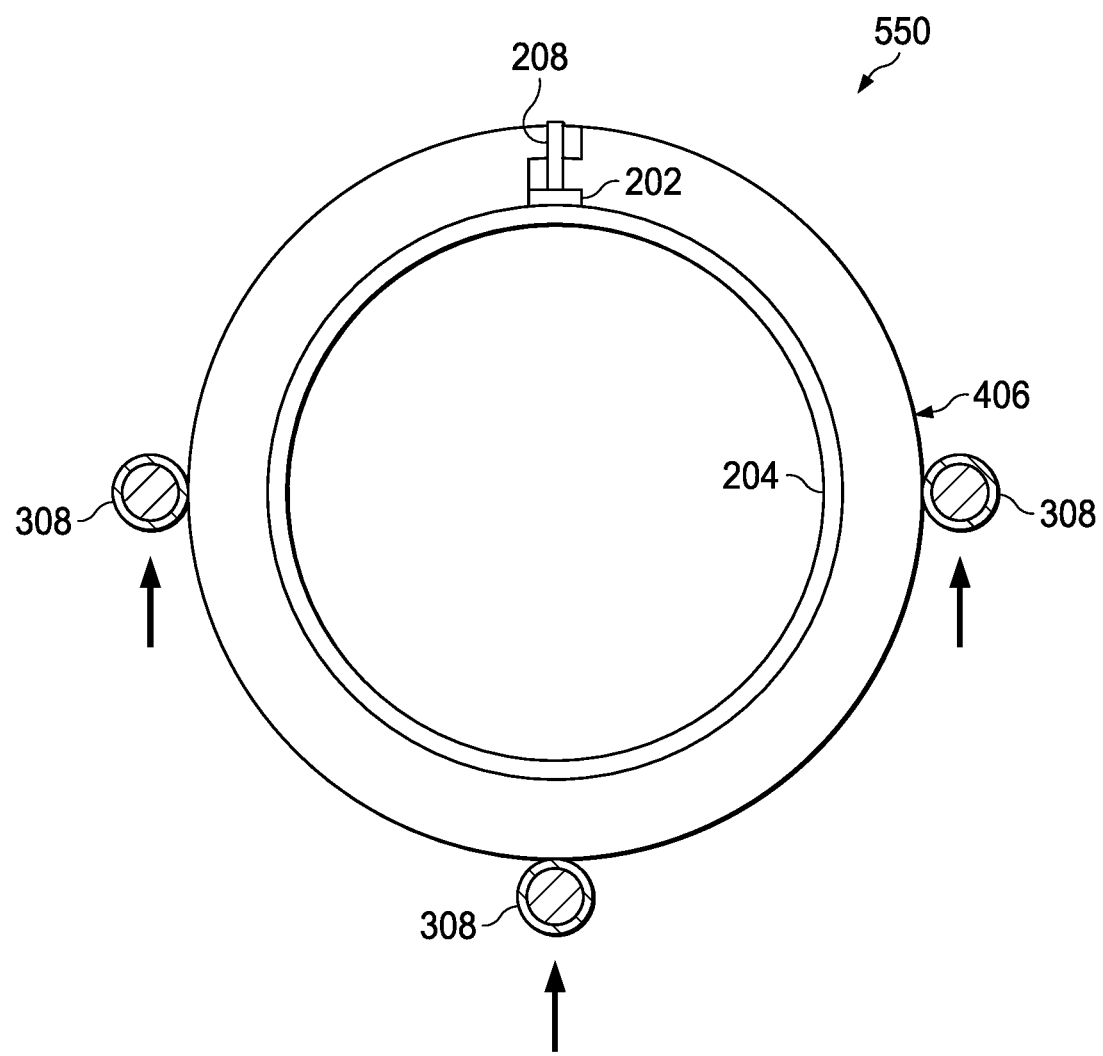
FIG. 5B is a diagram of an ending position of the technical sleeve and the strands 308 relative to the pipeline, according to some implementations of the present disclosure.

FIG. 5B is a diagram of an ending position 550 of the technical sleeve 406 and the strands 308 relative to the pipeline 204, according to some implementations of the present disclosure. Step 2 of the installation process of the technical sleeve 406 is an automated pipeline wrapping-around of the technical sleeve 406 through vertical displacement of the strands 308. In the ending position 550, the installation of the technical sleeve 406 onto the pipeline 204 is finalized. Step 3 of the installation process of the technical sleeve 406 can include a manual adjustment of the technical sleeve 406, including sealing (for example, gluing) with the pipe through pins screwed inside the plugs.

Figure 6:
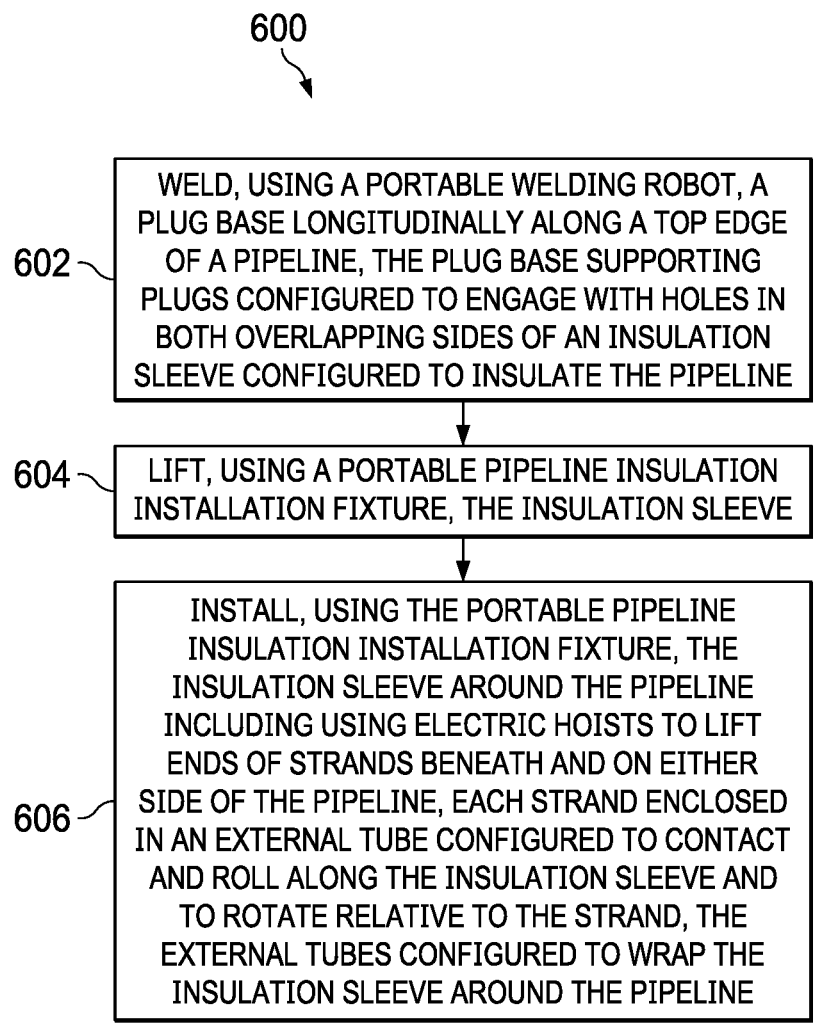
FIG. 6 is a flowchart of an example of a method for installing insulation sleeves on pipelines, according to some implementations of the present disclosure.

FIG. 6 is a flowchart of an example of a method 600 for installing insulation sleeves on pipelines, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, a plug base is welded longitudinally along a top edge of a pipeline. The welding is done using a portable welding robot, for example, the 5-axis welding robot 206. The plug base support plugs configured to engage with holes in both overlapping sides of an insulation sleeve configured to insulate the pipeline. As an example, the plug base 202 is installed on the pipeline 204, as described with reference to FIG. 2. From 602, method 600 proceeds to 604.

At 604, the insulation sleeve is lifted using a portable pipeline insulation installation fixture. For example, the system 400 can be used to lift the insulation into place relative to the pipeline 204. From 604, method 600 proceeds to 606.

At 606, the insulation sleeve is installed using the portable pipeline insulation installation fixture. The insulation sleeve is installed around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline. The installation can be done, for example, using techniques described with reference to FIGS. 2, 3A-3C, 4, and 5A-5B. After 606, method 600 can stop.

Figure 7:
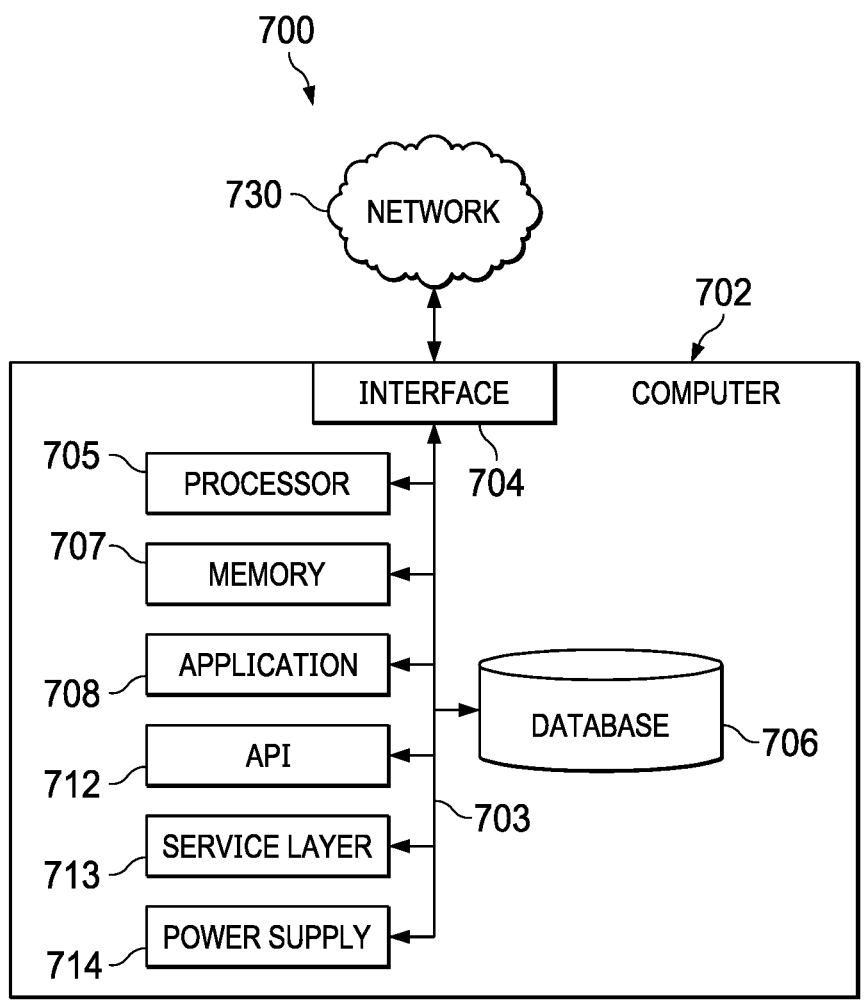
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a system is used for installing insulation sleeves on pipelines. A portable welding robot is configured to weld a plug base longitudinally along a top edge of a pipeline. The plug base supports plugs configured to engage with holes in both overlapping sides of an insulation sleeve configured to insulate the pipeline. A portable pipeline insulation installation fixture is configured to lift the insulation sleeve and install the insulation sleeve around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline.

The foregoing and other described implementations can each, optionally, include one or more of the following features:

A first feature, combinable with any of the following features, where the portable welding robot is a 5-axis welding robot.

A second feature, combinable with any of the previous or following features, where the insulation sleeve is a Shape Memory Polymer Based Passive Thermal Diode (SMP-PTD).

A third feature, combinable with any of the previous or following features, where the insulation sleeve is a Polymer Thermal Expansion Based Passive Thermal Diode (PTE-PTD).

A fourth feature, combinable with any of the previous or following features, where the insulation sleeve is a Phase Change Material (PCM)-PTD.

A fifth feature, combinable with any of the previous or following features, where layers of the SMP-PTD include a graphene layer, a first polyethylene terephthalate (PET) layer, a first polyurethane (PU) layer, a second PET layer, and a second PU layer.

A sixth feature, combinable with any of the previous or following features, where layers of the PTE-PTD include a graphene layer, a first PET layer, a first PU layer, a second PET layer, and a second PU layer.

A seventh feature, combinable with any of the previous or following features, where layers of the PCM-PTD include a graphene layer, a first PET layer, a first PU layer, a second PET layer, a second PU layer, and a cavity containing a control material.

In a second implementation, a method is used for installing insulation sleeves on pipelines. Using a portable welding robot, a plug base is welded longitudinally along a top edge of a pipeline. The plug base supports plugs that are configured to engage with holes in both overlapping sides of an insulation sleeve configured to insulate the pipeline. Using a portable pipeline insulation installation fixture, the insulation sleeve is lifted. Using the portable pipeline insulation installation fixture, the insulation sleeve is installed around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline.

The foregoing and other described implementations can each, optionally, include one or more of the following features:

A first feature, combinable with any of the following features, where the portable welding robot is a 5-axis welding robot.

A second feature, combinable with any of the previous or following features, where the insulation sleeve is a Shape Memory Polymer Based Passive Thermal Diode (SMP-PTD).

A third feature, combinable with any of the previous or following features, where the insulation sleeve is a Polymer Thermal Expansion Based Passive Thermal Diode (PTE-PTD).

A fourth feature, combinable with any of the previous or following features, where the insulation sleeve is a Phase Change Material (PCM)-PTD.

A fifth feature, combinable with any of the previous or following features, where layers of the SMP-PTD include a graphene layer, a first polyethylene terephthalate (PET) layer, a first polyurethane (PU) layer, a second PET layer, and a second PU layer.

A sixth feature, combinable with any of the previous or following features, where layers of the PTE-PTD include a graphene layer, a first PET layer, a first PU layer, a second PET layer, and a second PU layer.

A seventh feature, combinable with any of the previous or following features, where layers of the PCM-PTD include a graphene layer, a first PET layer, a first PU layer, a second PET layer, a second PU layer, and a cavity containing a control material.

In a third implementation, a non-transitory, computer-readable medium stores one or more instructions executable by a computer system to perform operations comprising the following. Using a portable welding robot, a plug base is welded longitudinally along a top edge of a pipeline. The plug base supports plugs that are configured to engage with holes in both overlapping sides of an insulation sleeve configured to insulate the pipeline. Using a portable pipeline insulation installation fixture, the insulation sleeve is lifted. Using the portable pipeline insulation installation fixture, the insulation sleeve is installed around the pipeline including using electric hoists to lift ends of strands beneath and on either side of the pipeline. Each strand is enclosed in an external tube configured to contact and roll along the insulation sleeve and to rotate relative to the strand. The external tubes are configured to wrap the insulation sleeve around the pipeline.

The foregoing and other described implementations can each, optionally, include one or more of the following features:

A first feature, combinable with any of the following features, where the portable welding robot is a 5-axis welding robot.

A second feature, combinable with any of the previous or following features, where the insulation sleeve is a Shape Memory Polymer Based Passive Thermal Diode (SMP-PTD).

A third feature, combinable with any of the previous or following features, where the insulation sleeve is a Polymer Thermal Expansion Based Passive Thermal Diode (PTE-PTD).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A system for installing insulation sleeves on pipelines, comprising:
   a portable welding robot configured to weld a plug base longitudinally along a top edge of a pipeline, the plug base supporting plugs configured to engage with holes in both overlapping sides of an insulation sleeve configured to insulate the pipeline; and
   a portable pipeline insulation installation fixture configured to lift the insulation sleeve and install the insulation sleeve around the pipeline including using electric hoists to lift ends of strands beneath and on either side of the pipeline, each strand enclosed in an external tube configured to contact and roll along the insulation sleeve and to rotate relative to the strand, the external tubes configured to wrap the insulation sleeve around the pipeline.

2. The system of claim 1, wherein the portable welding robot is a 5-axis welding robot.

3. The system of claim 1, wherein the insulation sleeve is a Shape Memory Polymer Based Passive Thermal Diode (SMP-PTD).

4. The system of claim 1, wherein the insulation sleeve is a Polymer Thermal Expansion Based Passive Thermal Diode (PTE-PTD).

5. The system of claim 1, wherein the insulation sleeve is a Phase Change Material (PCM)-PTD.

6. The system of claim 3, wherein layers of the SMP-PTD include a graphene layer, a first polyethylene terephthalate (PET) layer, a first polyurethane (PU) layer, a second PET layer, and a second PU layer.

7. The system of claim 4, wherein layers of the PTE-PTD include a graphene layer, a first PET layer, a first PU layer, a second PET layer, and a second PU layer.

8. The system of claim 5, wherein layers of the PCM-PTD include a graphene layer, a first PET layer, a first PU layer, a second PET layer, a second PU layer, and a cavity containing a control material.

9. A method for installing insulation sleeves on pipelines, comprising:
welding, using a portable welding robot, a plug base longitudinally along a top edge of a pipeline, the plug base supporting plugs configured to engage with holes in both overlapping sides of an insulation sleeve configured to insulate the pipeline;
lifting, using a portable pipeline insulation installation fixture, the insulation sleeve; and
installing, using the portable pipeline insulation installation fixture, the insulation sleeve around the pipeline including using electric hoists to lift ends of strands beneath and on either side of the pipeline, each strand enclosed in an external tube configured to contact and roll along the insulation sleeve and to rotate relative to the strand, the external tubes configured to wrap the insulation sleeve around the pipeline.

10. The method of claim 9, wherein the portable welding robot is a 5-axis welding robot.

11. The method of claim 9, wherein the insulation sleeve is a Shape Memory Polymer Based Passive Thermal Diode (SMP-PTD).

12. The method of claim 9, wherein the insulation sleeve is a Polymer Thermal Expansion Based Passive Thermal Diode (PTE-PTD).

13. The method of claim 9, wherein the insulation sleeve is a Phase Change Material (PCM)-PTD.

14. The method of claim 11, wherein layers of the SMP-PTD include a graphene layer, a first polyethylene terephthalate (PET) layer, a first polyurethane (PU) layer, a second PET layer, and a second PU layer.

15. The method of claim 12, wherein layers of the PTE-PTD include a graphene layer, a first PET layer, a first PU layer, a second PET layer, and a second PU layer.

16. The method of claim 13, wherein layers of the PCM-PTD include a graphene layer, a first PET layer, a first PU layer, a second PET layer, a second PU layer, and a cavity containing a control material.

17. A non-transitory, computer-readable medium storing one or more instructions executable by a computer system to perform operations comprising:
welding, using a portable welding robot, a plug base longitudinally along a top edge of a pipeline, the plug base supporting plugs configured to engage with holes in both overlapping sides of an insulation sleeve configured to insulate the pipeline;
lifting, using a portable pipeline insulation installation fixture, the insulation sleeve; and
installing, using the portable pipeline insulation installation fixture, the insulation sleeve around the pipeline including using electric hoists to lift ends of strands beneath and on either side of the pipeline, each strand enclosed in an external tube configured to contact and roll along the insulation sleeve and to rotate relative to the strand, the external tubes configured to wrap the insulation sleeve around the pipeline.

18. The non-transitory, computer-readable medium of claim 17, wherein the portable welding robot is a 5-axis welding robot.

19. The non-transitory, computer-readable medium of claim 17, wherein the insulation sleeve is a Shape Memory Polymer Based Passive Thermal Diode (SMP-PTD).

20. The non-transitory, computer-readable medium of claim 17, wherein the insulation sleeve is a Polymer Thermal Expansion Based Passive Thermal Diode (PTE-PTD).

* * * * *